May 29, 1945.　　　　　H. T. AVERY　　　　　2,376,954
CARRIAGE SHIFT MECHANISM
Filed Sept. 6, 1938　　　3 Sheets-Sheet 1
FIG_1_
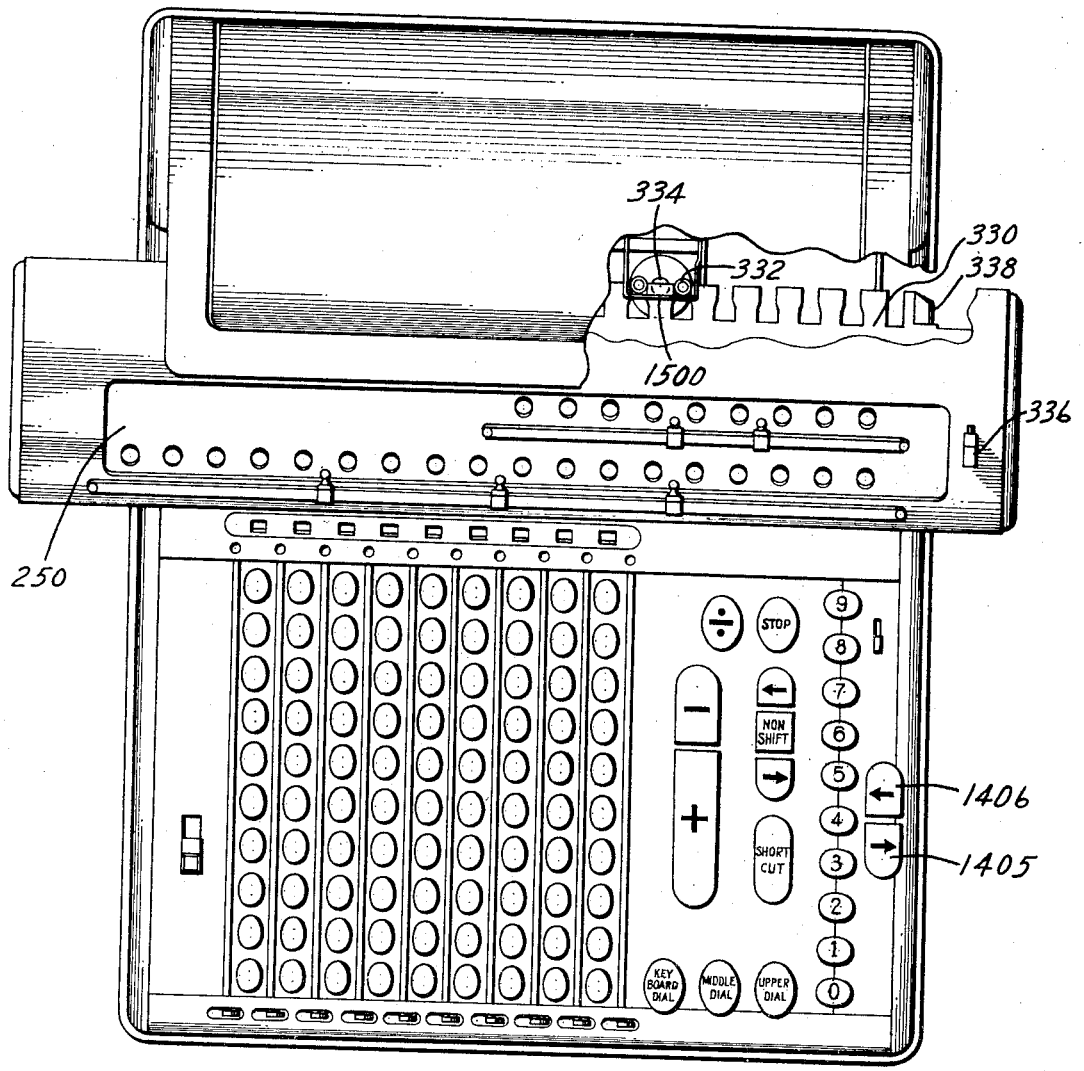
INVENTOR.
Harold T. Avery
BY 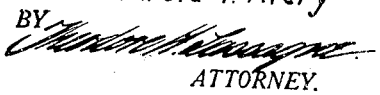
ATTORNEY.

May 29, 1945.　　　　H. T. AVERY　　　　2,376,954
CARRIAGE SHIFT MECHANISM
Filed Sept. 6, 1938　　　　3 Sheets-Sheet 2
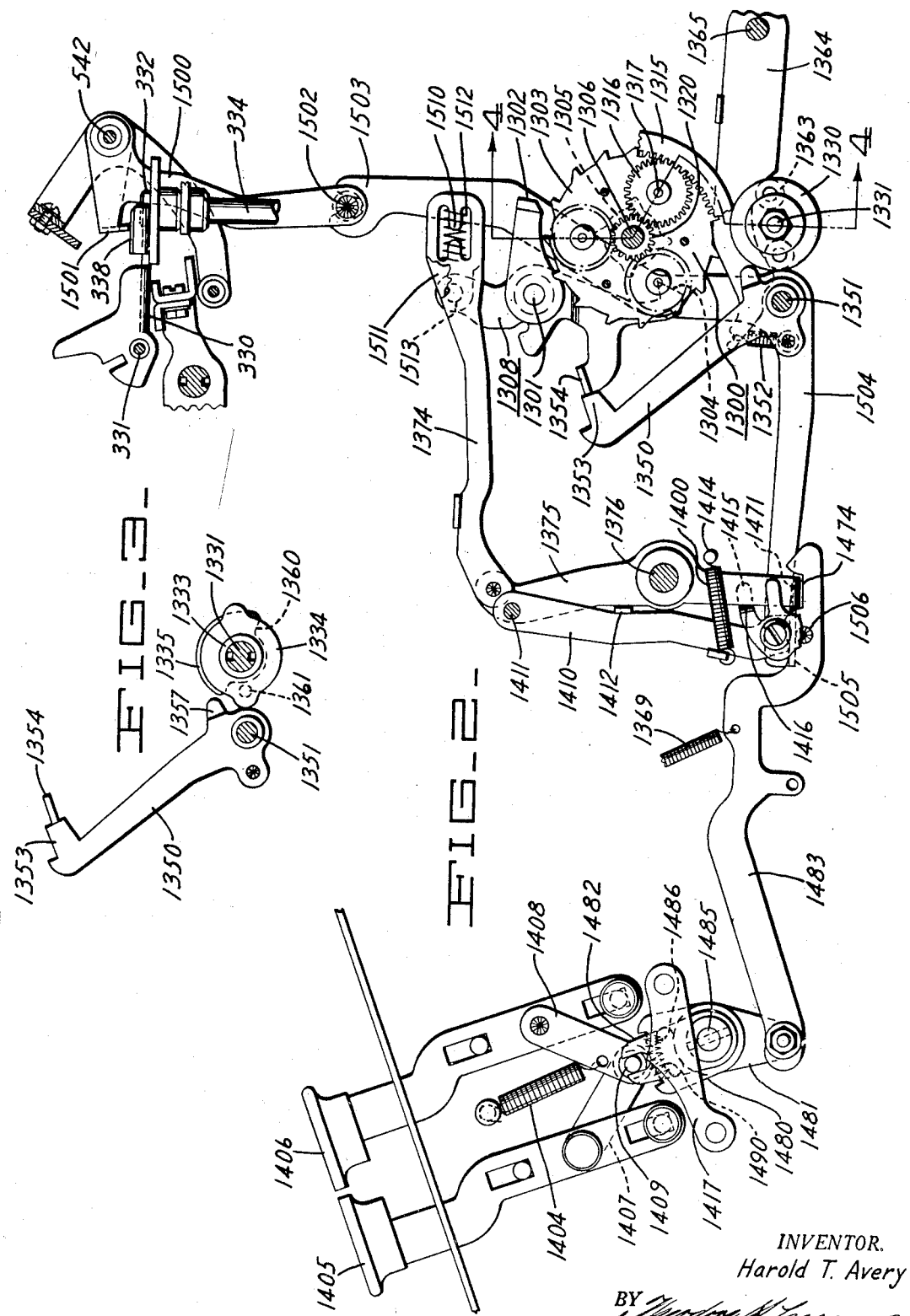
INVENTOR.
Harold T. Avery
BY
ATTORNEY.

May 29, 1945.  H. T. AVERY  2,376,954
CARRIAGE SHIFT MECHANISM
Filed Sept. 6, 1938  3 Sheets-Sheet 3
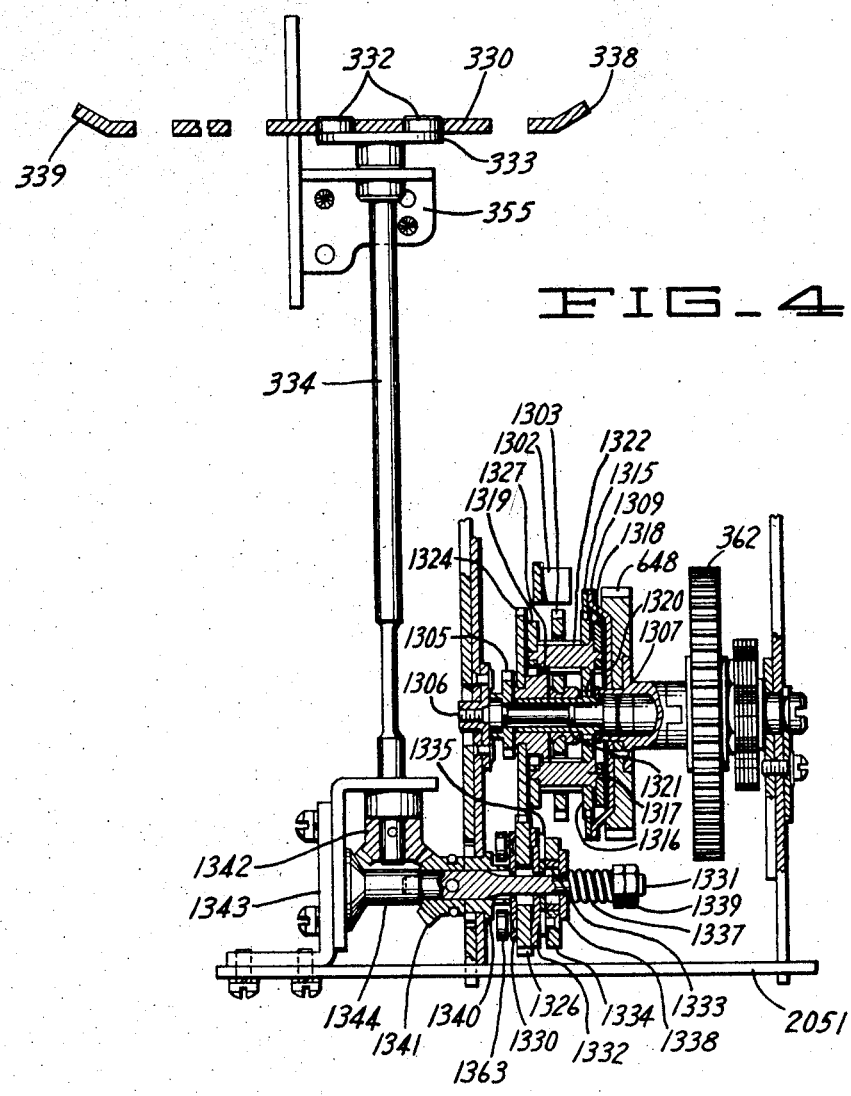
INVENTOR.
Harold T. Avery
BY
ATTORNEY.

Patented May 29, 1945

2,376,954

UNITED STATES PATENT OFFICE 2,376,954

CARRIAGE SHIFT MECHANISM

Harold T. Avery, Oakland, Calif., assignor to Marchant Calculating Machine Company, a corporation of California Application September 6, 1938, Serial No. 228,613

9 Claims. (Cl. 235—63)

The present invention relates to calculating machines of the type adapted to perform the four cardinal calculations and combinations thereof, and particularly to the type in which actuators are mounted in the frame of the machine and a register is mounted in a carriage transversely shiftable on said frame. For a disclosure of a complete calculating machine, including mechanisms not specifically disclosed herein, reference is hereby made to the Avery patent application Serial Number 702,949 filed December 18, 1933, of which the present application is a continuation in part, and which has since matured into Patent Number 2,211,736, issued on August 13, 1940. It is to be understood, however, that although the invention is shown applied to a machine of the general type disclosed in this description, it will appear that the invention is applicable to a machine of the type in which the carriage is stationary and the actuator is shifted, or to one in which the carriage and actuator are stationary and devices connecting the actuators and the register are shifted.

In a machine of the general type disclosed in the aforesaid patent, a power transmission mechanism is provided whereby the shiftable carriage may be moved laterally by power derived from the motor. This motor may operate continuously, but preferably is controlled by an electric switch, automatically closed upon forward movement of lever 1410 during the first part of the shift initiating operation, as disclosed in detail in the aforesaid Avery patent. Control of this carriage shifting is effected by clutch means forming a part of such mechanism, and a key, or preferably, two keys are provided whereby the clutch means may be rendered effective to cause the carriage to be shifted in one, or selectively, in the other direction. In related types of machines the actuators may be shifted with respect to a fixed register, or devices connecting a fixed register and fixed actuators may be shifted by similar power transmission mechanism.

When a carriage shift control key is depressed by the operator of such a machine, the carriage is thus moved, in the selected direction, into the desired operating position. The clutch means functioning in this operation should, preferably, operate cyclically so that, even though the key is depressed and immediately released, the carriage will be moved a full step into the next operating position. It is also desirable to provide for repeated cyclic operation of such clutch means so that if the control key is held depressed by the operator, the carriage will shift through one or more operating positions, but will always come to rest in an operating position, regardless of when the key is released. The invention, in its broader aspects, is applicable, however, to machines in which the shift key must be repeatedly depressed to secure successive carriage shifts.

It is an object of the present invention to provide means, in machines of this general class, which will function when the carriage is in one or the other end position to prevent the transmission to it of any driving force tending to move it beyond such position, without interfering with carriage shifting in the opposite direction. According to a preferred embodiment of the invention, hereinafter disclosed, this may be accomplished by providing a releasable driving connection in the driving train to the carriage, whereby said driving train will be temporarily broken when the carriage shifting controls are operated in such a way as would otherwise transmit to the carriage a driving force tending to move it beyond either of its end positions.

It is a further object of the invention to provide means whereby useless operation of the carriage shifting drive train will be prevented when an attempt is made to operate it in a direction which would tend to shift the carriage beyond either of its end positions. In the embodiment disclosed, this result may be accomplished with a machine equipped with a releasable driving connection, such as has been mentioned, by means rendered effective upon the first operation of the shift drive train in a direction tending to move the carriage beyond either of its end positions, for interrupting operation of said train even though a shift key is held depressed.

Another object of the invention is to provide means whereby the machine will indicate to the operator when the end carriage position has been reached.

Other objects will appear during the following detailed description of a preferred form of the invention, reference being made to the accompanying drawings, forming a part of this specification, in which:

Figure 1 is a plan view of the machine with part of the back cover and carriage covers cut away.

Figure 2 is a view, in elevation, of the right side of the shift controlling mechanism.

Figure 3 is a detail sectional view showing the cam and centralizer which control the cyclic disengagement of the shift clutch.

Figure 4 is a sectional view of the shift clutch, taken on the line 4—4 of Figure 2.

Shift actuating mechanism

The machine is provided with a motor (not shown) which constitutes the driving means for the shift clutch 1300 (Figure 2). The power is transmitted from the motor through suitable gears and shafts to gear 362 (Figure 4) to drive the shift clutch. Said gear is rotatably mounted on shaft 1306 which is positioned between the center and right side frames of the machine. Gear 648, used to drive unrelated mechanisms, is also rotatably mounted on shaft 1306 by a flanged sleeve 1307, which is keyed to the hub of gear 362 and secured by rivets to gear 648, the same rivets affixing a dished ring gear supporting disc 1309 to the said gear 648.

The shift clutch comprises an internal ring gear 1315 secured to the supporting disc 1309 and enmeshed with three planetary gears 1316 riveted to each of three shafts 1317, respectively, which extend through clearance holes provided in ratchet wheel 1303, and have end bearings in plates 1318 and 1319. The gears 1316 mesh also with a sun gear 1320 formed upon one end of a sleeve 1321 to the opposite end of which a second ratchet wheel 1305 is keyed. Gear teeth 1322 formed on the shafts 1317 mesh with a second sun gear 1327 to which is secured gear 1324 by which power is transmitted from this shift clutch to the shift drive train.

This shift clutch may be operated to transmit power to the shift drive train, selectively rotating the same in either direction. Gear 362 is always rotated when the motor is running, driving gear 648 and ring gear 1315 so that planetary gears 1316, and their associated gears 1322 will normally revolve idly about sun gear 1327. If the ratchet wheel 1303 is held, however, as when dog 1302 (Figure 2) is rocked into engagement therewith, revolution of the planetary gears 1316 and gears 1322 about sun gears 1320 and 1327 is prevented and said planetary gears function as idlers to transmit the drive to the sun gear 1327, and its associated gear 1324. If, however, the other ratchet wheel 1305 is held by dog 1304 (Figure 2), being rocked into engagement therewith, sun gear 1320 will be held stationary and the planetary gears 1316 and gears 1322 will all rotate about their own centers and revolve about sun gear 1320, thereby driving the gear 1324 in the opposite direction.

The direction of rotation of gear 1324 determines the direction of shift of the carriage. A gear 1326 meshing with gear 1324 is rotatably mounted on the shaft 1331 (Figure 4) between friction discs 1330 and 1332 keyed to said shaft. A sleeve 1333 is also mounted on shaft 1331 and supports a cam 1334 thereon (Figures 3 and 4) while a disc 1335 is keyed to the shaft 1331. Spring 1337 is compressed between washer 1338 and lock nuts 1339 on the threaded end of shaft 1331. This construction provides for a friction drive connection between gear 1326 and shaft 1331 effected by discs 1330 and 1332, which are pressed against the gear 1326 by spring 1337 bearing against the washer 1338, the spacer 1333, and the disc 1335.

The shaft 1331 is supported in a suitable bearing 1340 securely mounted in a frame of the machine, and a sleeve bearing 1344 riveted to an angle bracket 1343. A bevel gear 1341 is fixed on the end of the shaft 1331 and meshes with a bevel gear 1342 securely mounted on the lower end of vertical shaft 334, also supported in the adjustable angle bracket 1343 secured to the base plate of the machine.

The aforesaid shaft 334 is supported at its upper end by bracket 355 secured to the back frame plate of the machine. The upper end of shaft 334 also has fixed thereto a hub and plate assembly 333 on which are mounted rollers 332 adapted to engage between the teeth of rack 330, mounted on the shiftable carriage 250 (see also Figure 1), and thereby, upon rotation of the assembly 333 by the shaft 334, serves to drive the carriage laterally to the right or to the left.

Shift control mechanism

The controls for the carriage shift are operable by the keys 1405 and 1406 (Figures 1 and 2), and means are provided whereby the depression of one or the other of said keys will effect the engagement of its respective dog 1302 or 1304 with one of the shift clutch ratchets 1303 or 1305, respectively, thereby determining the direction of the shift.

The keys 1405 and 1406 comprises vertically sliding stems, which are connected by means of links 1407 and 1408 (Figure 2) with a common pin 1409 pivotally attached thereto, while a spring 1404, tensioned between one of said links and the machine frame, normally urges both of the keys 1405 and 1406 upwardly. Upon depression of the key 1405, the pin 1409 is moved to the right, and upon depression of the key 1406 the pin 1409 is moved to the left, as viewed in Figure 2. A stationary member 1417 guides the pin 1409 in either its right or left hand movement and also serves as an interlock so that neither one of the keys 1405 or 1406 can be depressed when the other one is in a depressed position.

Either right or left hand movement of the pin 1409 will be transmitted through bifurcated arm 1482 to rock the shaft 1485, to which arm 1482 is pinned, clockwise or counter-clockwise, depending upon which of the keys is depressed. Disposed on the shaft 1485, adjacent to each other, are two similar V-shaped members 1480 and 1481, each of which is provided with two facing lugs 1486. The spring 1490 is compressed between these four lugs so that a rocking movement in either direction can be transmitted from one of the V-shaped members to the other through the spring 1490. Member 1480 is pinned to the shaft 1485 and is rocked by the movement of arm 1482, thus rocking the member 1481 which is free on the shaft 1485, and which has a downwardly extending arm pivotally connected to the link 1483 which is thus pushed to the right when key 1406 is depressed. If, for any reason, movement of link 1483 is prevented at any time, depression of either key will merely compress spring 1490 without moving the member 1481, but under normal conditions the movement described will be effected. This results in the rocking, about its pivot 1376, of the lever 1375 which is provided with a lateral projection 1471, normally engaging in a notch 1474 in the rearward end of link 1483 held in engagement with said projection by spring 1369 tensioned between link 1483 and a stud on the machine frame.

The rocking of lever 1375 imparts longitudinal movement to link 1374 pivoted to the upper end thereof and provided at its rear end with an aperture in which are two facing lugs 1510. Adjacent the rear end of link 1374 is a link 1511 with an identical aperture, also with two facing lugs. Link 1374 and link 1511 are yieldingly connected by compression spring 1512 located over the four lugs 1510, and link 1511 is pivotally connected at its forward end to the shift clutch control dog 1306 by a stud 1513, so that longitudinal movement of link 1374 will cause rocking movement of the clutch control dog about shaft 1301. The control dog 1306 has a rearwardly extending arm provided with a dog 1302 adapted to engage ratchet wheel 1303, and a downwardly extending arm provided with a dog 1304 adapted to engage the ratchet wheel 1305.

Thus, upon depression of key 1406 to initiate a carriage shift to the left, the link 1483 is moved to the right, as viewed in Figure 2, imparting counter-clockwise movement to the lever 1375, leftward movement to link 1374, and counter-clockwise movement to the control dog 1308, moving dog 1304 into engagement with the ratchet wheel 1305 to cause transmission of the drive to the carriage, as has been previously described.

When a right hand carriage shift is desired, the key 1405 is depressed, thus moving the link 1483 to the left to rock lever 1375 in a clockwise direction. This rocking movement of lever 1375 moves the link 1374 to the right causing the dog 1302 to engage the ratchet 1303, thus reversing the driving direction of the carriage shifting mechanism, as was described in the section entitled "Shift actuating mechanism."

Means are provided whereby dogs 1302 and 1304 are held in engagement with their respective ratchet wheels during approximately the first three-quarters of the shift cycle, to insure the completion of any initiated shift, no matter how quickly the key is released. On a leftward extension of the clutch control dog 1308 (Fig. 2) is a formed ear 1354, adapted to engage the projection 1353 of latch 1350, pivotally mounted at 1351 and urged into engagement with said ear by spring 1352. When control dog 1308 is moved either clockwise or counter-clockwise, the ear 1354 is released from against latch 1350 which rocks about shaft 1351 under the tension of spring 1352 and seats its projection 1353 either above or below ear 1354, thus latching the clutch control dog 1308 against return movement.

Provision is made whereby additional tension is put on spring 1352 at the beginning of the shift cycle. For this purpose, centralizer 1364 is utilized by attaching the upper end of spring 1352 to the extreme left end of said centralizer. When the shift clutch 1300 first begins to rotate, rollers 1363 revolve about their shaft 1331, and in their movement the rollers 1363 cam the centralizer 1364 upwardly, thereby exerting more and more tension on the spring 1352 until the shaft 1331 has made one-quarter of a rotation.

Provision is made whereby latch 1350 is moved by cam 1334 (Figure 3) to release the ear 1354 during the latter part of the cycle. It will be seen that the cam 1334 includes two opposite rises over which a nose 1357 of the lever 1350 rides; the two rises being required because one-half rotation of shaft 1331 is a full cycle of the shift mechanism. Upon counter-clockwise rotation of the cam from the position shown in Figure 3, the nose 1357 is cammed upwardly during the latter part of the cycle. To provide for unlatching during the latter part of the cycle, for the reverse rotation of shaft 1331, the cam 1334 is free on the shaft and is driven by the disc 1335 keyed to shaft 1331 and provided with two shoulders 1360 on opposite sides thereof. Upon clockwise rotation of the disc 1335 from the position shown in Figure 3, pin 1361 on the cam 1334 is engaged by the opposite shoulder 1360 and is rotated to unlatch ear 1354 during the latter part of this reverse cycle.

When the latch 1350 is thus released, the clutch control dog 1308 is automatically centralized to remove the effective dog 1302 or 1304 from engagement with its ratchet. For this purpose the lever 1410 is pivotally mounted in the machine frame at 1411, provided with a lug 1412 extending laterally into engagement with lever 1375 above the pivot 1376, and an adjustable lug 1415 having an offset 1416 engaging the lever 1375 below said pivot, and pressed against the lever 1375 by a spring 1400 tensioned between the free end of lever 1410 and a stud 1414 on the machine frame. Thus the centralizer 1410 tends to maintain the lever 1375 in a central position in which the clutch dog 1308 will be ineffective, and will return it to said central position automatically upon release of latch 1350 provided the operating keys 1405 and 1406 are released.

Although the drive to the carriage through the shift clutch is thus terminated at approximately three-quarter cycle position, the shift drive train will be rotated through the remainder of its cycle, consisting of one-quarter of a rotation of shaft 1331, by the centralizer 1364, pressed by spring 1352 against rollers 1363 on disc 1330 secured to said shaft.

*Disabling of shift in end positions*

Means are provided for preventing transmission to the carriage of any driving force tending to move beyond either of its end positions.

As briefly described hereinbefore, the rollers 332 drive the carriage, when the shift clutch 1300 functions, by successively engaging between the teeth of the shift rack 330, pivotally mounted on the carriage at 331 (Figure 2). When the carriage reaches either of its end positions, the last tooth of the rack 330 is in the position to be engaged by a roller 332. An outer ear 338 (Figure 4) of said last tooth of rack 330 is formed diagonally upward, thereby forming a cam surface adapted to be engaged by the roller 332. As said roller revolves and contacts the camming surface under ear 338, it rocks rack 330 upwardly about its pivot on the shaft 331 (Figure 2) and permits the roller to pass under the tooth without lateral driving effect.

Means are provided whereby the shift clutch will be arrested to prevent useless movement of the shift drive train after the carriage reaches its extreme right or left position. A lever 1500 is rockably mounted on shaft 542 and is in the form of a bail, as shown in Figure 1. The forward end 1501 (Figure 2) is located so as to be directly over the ear 338 or ear 339 of the rack 330 when the carriage is in one or the other extreme end position, so that upward movement of said rack, when an attempt is made to shift the carriage beyond either end position, will impart a clockwise movement to the lever 1500. On the downwardly extending arm of lever 1500 is secured a stud 1502 embraced by the bifurcated end 1503 of a lever 1504 pivoted on shaft 1351. Lever 1504 has on its forwardly extending arm, a formed ear 1505 which overlies a stud 1506 in lever 1483. Ear 1505 is of sufficient length to engage stud 1506 when lever 1483 is in either its extreme rearward or forward position.

Lever 1483 may thus be forced down by movement of ear 1505, so that notch 1474 of lever 1483 will disengage the lateral extension 1471 of lever 1375. If lever 1375 is out of its centralized position, as it is when either shift key is depressed, spring 1400 is tensioned and tends to force lever 1375 to its neutral position through the action of lever 1410. If, therefore, notch 1474 is removed from engagement with ear 1471, spring 1400 will rock lever 1410 and lever 1375 until they reach their neutral positions. In either extreme end carriage position, one of the ears 338 or 339 underlies the bail 1501 and as rack 330 rises, as previously described, it imparts a clockwise movement to lever 1500 causing rotation of lever 1504 in a counter-clockwise direction about shaft 1351. During the said counter-clockwise movement of lever 1504 the ear 1505, formed on the forward extension of lever 1504, moves downwardly to engage the stud 1506, and carries with it the rear end of lever 1483, thereby removing notch 1474 from engagement with the ear 1471 of lever 1375. With the notch 1474 removed from ear 1471, lever 1375, link 1374, and the clutch control dog 1308 will be free to swing back to their neutral positions under pressure of spring 1400, as previously described, as soon as the latch 1350 is disengaged from the ear 1354, even though one of the shift keys is held depressed.

When the driving shaft 1331 centralizes, as hereinbefore described, roller 332 will have moved from beneath the tooth of the rack 330, thus allowing said rack to drop to its lowered position and allowing lever 1500 to return to its original position. This is brought about by the action of spring 1369 which raises the rear end of lever 1483, and forces lever 1504 in a clockwise direction by pressure against ear 1505. The clockwise movement of lever 1504 moves lever 1500 to its original position with its bail 1501 overlying ear 338.

If, at this time, the operator continues to hold either key 1405 or 1406 in a depressed position, the link 1483 will remain in either its rearward or forward position, depending upon which key is being held depressed. The rear end of lever 1483, having been lowered to disengage notch 1474 from the ear 1471 by the mechanism just described, has allowed lever 1375 to return to its neutral position under the pressure of spring 1400, but lever 1483, being in its said rearward or forward position depending on which key is being held depressed, will be held down by the ear 1471 where it will remain until the key 1405 or 1406 is released, at which time notch 1474 will be aligned with ear 1471 and allowed to rise to the normal position shown in Figure 2.

From the foregoing it is evident that if the same key 1405 or 1406 is again depressed, the control dog 1308 will again operate clutch 1300, and the shaft 334 and rollers 332 will rotate in the same direction, thereby again camming ear 338 upwardly, disengaging the notch 1474 from ear 1471 after one cycle of rotation of said rollers, to arrest the shifting mechanism in the manner previously described.

It is evident also that if the key, other than the one last depressed, is depressed, the clutch will again be engaged but will revolve in the opposite direction, thereby driving shaft 334 and rollers 332 to shift the carriage in the opposite direction. In this opposite directional movement, if the key is held depressed, the rollers will successively engage between each of the teeth of the rack 330, thereby driving the carriage laterally to the other extreme end position, at which position another ear 339, formed on the opposite end of rack 330, will have moved into a position underlying bail 1501. When the carriage has reached this extreme end position, any further shift cycle in the same direction will cause the ear 339 and the rack 330 to be cammed upwardly by roller 332 in the same manner in which the movement of ear 338 was effected. Upon such movement of ear 339, lever 1500 will be rocked clockwise about its center 542, imparting counter-clockwise movement to lever 1504, thereby disengaging notch 1474 from ear 1471 as previously described.' Lever 1375 will be free to spring back to its neutral position through the compound action of spring 1400 and lever 1410, thereby disengaging the clutch and again stopping the shifting mechanism.

I claim:

1. In a motor driven calculating machine comprising a frame having a transversely shiftable carriage thereon, carriage shifting mechanism comprising a control member movable in opposite directions from a central ineffective position to cause said motor to shift said carriage in one or the other direction respectively, means comprising a pair of manipulable members and a single link movable thereby and operatively connected to said control member to move the same selectively in either direction, means operable by said carriage shifting mechanism for interrupting the operative connection between said link and said control member, and means for returning said control member to ineffective position upon interruption of said connection.

2. In a motor driven calculating machine comprising a frame having a transversely shiftable carriage thereon, carriage shifting mechanism comprising a control member movable in opposite directions from a central ineffective position to cause said motor to shift said carriage in one or the other direction respectively, manipulable members operatively connected to said control member to move the same selectively in either direction, means operable by said carriage shifting mechanism for interrupting the operative connection between said manipulable members and said control member, means for returning said control member to ineffective position, and means automatically responsive to said manipulable member upon manual release thereof and effective upon return of said control member to ineffective position for reconstituting said operative connection.

3. In a motor driven calculating machine comprising a frame having a carriage transversely shiftable to any of a series of ordinal positions thereon, carriage shifting mechanism comprising a control member movable from a normal ineffective position to cause said motor to shift said carriage and movable back to ineffective position to interrupt such shifting after one or more orders of shifting movement of said carriage, a manipulable member operatively connected with said control member to move the same to carriage shifting position, means rendered effective in response to movement of said carriage to either end position and operated by said carriage shifting mechanism for interrupting the operative connection between said manipulable member and said control member, means for returning said control member to ineffective position, and means automatically responsive to said manipulable member upon manual release thereof and effective upon return of said control member to ineffective position for reconstituting said operative connection.

4. In a motor driven calculating machine comprising a frame having a transversely shiftable carriage thereon, carriage shifting mechanism comprising a control member movable in opposite directions from a central ineffective position to cause said motor to shift said carriage in one or the other direction respectively, manipulable members operatively connected to said control member to move the same selectively in either direction, means rendered effective in response to movement of said carriage to either end position and operated by said carriage shifting mechanism for interrupting the operative connection between said manipulable members and said control member, means for returning said control member to ineffective position, and means automatically responsive to said manipulable member upon manual release thereof and effective upon return of said control member to ineffective position for reconstituting said operative connection.

5. In a motor driven calculating machine, a carriage shiftable to any of a series of operating positions, carriage shifting means operable by the motor to shift the carriage in either direction to any of said positions including a cyclic clutch and yieldable elements between said clutch and the carriage adapted to prevent shifting of the carriage beyond either end position upon overdriving of said shifting means, a control element for said clutch, a pair of directional shift keys for controlling said shifting means, a shift operation control train common to both of said keys, operable by either of said keys to move the clutch control element to drive transmitting position, and including a member adjustable to disable said train and thus permit movement of said element from said position while the operated key is held depressed, means responsive to either such adjustment of said member or return of an operated key for disengaging the clutch at the conclusion of its current cycle, tripping means operable in response to yielding of a yieldable element to adjust said member as aforesaid and means responsive to return of a depressed key for readjusting said member to normal position to re-enable said common control train.

6. In a motor driven calculating machine, a carriage transversely shiftable to any of a series of ordinally spaced operating positions, carriage shifting means operable by the motor to shift the carriage and including, a cyclic shift clutch operable through a selected number of cycles, a shift drive train adapted to transmit the shifting force from the clutch to the carriage and to thus shift the carriage through the number of ordinal steps corresponding to the number of cycles through which the clutch is operated, and a yieldable element in said train operable upon overdriving of the drive train after the carriage reaches an end position to prevent transmission of the shifting force from the clutch to the carriage, shift control means for causing the carriage shifting means to shift the carriage selectively as aforesaid comprising, a clutch control element movable from a clutch disengaging position to a clutch engaging position, a shift key, and a shift control train operable by said key upon depression thereof to move the clutch control element to said clutch engaging position and normally effective to maintain the same in such position while said key remains depressed, a member adjustable to disable said control train and thus permit return of said control element to clutch disengaging position while said key is held depressed, means responsive to such adjustment of said member for causing the control element to disengage the clutch at the conclusion of its current cycle, and tripping means operable in response to yielding of said yieldable element to adjust said disabling member as aforesaid.

7. In a motor driven calculating machine, a carriage shiftable to any of a series of operating positions, carriage shifting means operable by the motor to shift the carriage to any of said positions including a cyclic clutch and yieldable elements between said clutch and the carriage adapted to prevent shifting of the carriage beyond an end position upon overdriving of said shifting means, a control element for said clutch, a shift key for controlling said shifting means, a shift operation control train operable under control of said key to move the clutch control element to drive transmitting position, and including a member adjustable to disable said train and thus permit movement of said element from said position while the key is held depressed, means responsive to either such adjustment of said member or return of the key for disengaging the clutch at the conclusion of its current cycle, tripping means operable in response to yielding of the yieldable element to adjust said member as aforesaid, and means responsive to return of said depressed key for readjusting said member to normal position to re-enable said control train.

8. In a motor driven calculating machine, a carriage shiftable to any of a series of operating positions, carriage shifting means operable by the motor to shift the carriage to any of said positions including a cyclic clutch and yieldable elements between said clutch and the carriage adapted to prevent shifting of the carriage beyond an end position upon overdriving of said shifting means, a control element for said clutch, a shift key for controlling said shifting means, a shift operation control train operable under control of said key to move the clutch control element to drive transmitting position, and including a member adjustable to disable said train and thus permit movement of said element from said position while the key is held depressed, means responsive to such adjustment of said member for disengaging the clutch at the conclusion of its current cycle, and tripping means operable in response to yielding of a yieldable element to adjust said member as aforesaid.

9. In a motor driven calculating machine, a carriage shiftable to any of a series of operating positions, carriage shifting means operable by the motor to shift the carriage in either direction to any of said positions including a cyclic clutch and yieldable elements between said clutch and the carriage adapted to prevent shifting of the carriage beyond either end position upon overdriving of said shifting means, a control element for said clutch, a pair of directional shift keys for controlling said shifting means, a shift operation control train common to both of said keys, operable by either of said keys to move the clutch control element to drive transmitting position, and including a member adjustable to disable said train and thus permit movement of said element from said position while the operated key is held depressed, means responsive to such adjustment of said member for disengaging the clutch at the conclusion of its current cycle, and tripping means operable in response to yielding of a yieldable element to adjust said member as aforesaid.

HAROLD T. AVERY.